United States Patent
Simoes et al.

(10) Patent No.: US 9,391,323 B2
(45) Date of Patent: Jul. 12, 2016

(54) SURFACE MODIFIED LITHIATED $H_2V_3O_8$

(71) Applicant: Belenos Clean Power Holding AG, Bienne (CH)

(72) Inventors: Mario Simoes, Zürich (CH); Yoann Mettan, Evionnaz (CH); Anke Weidenkaff, Dübendorf (CH); Simone Pokrant, Zürich (CH)

(73) Assignee: Belenos Clean Power Holding AG, Bienne (CH)

( * ) Notice: Subject to any disclaimer, the term of this patent is extended or adjusted under 35 U.S.C. 154(b) by 293 days.

(21) Appl. No.: 14/226,183

(22) Filed: Mar. 26, 2014

(65) Prior Publication Data

US 2014/0295271 A1 Oct. 2, 2014

(30) Foreign Application Priority Data

Mar. 26, 2013 (EP) .................................. 13161096
Jul. 11, 2013 (EP) .................................. 13176170

(51) Int. Cl.
*H01M 4/485* (2010.01)
*C01D 15/02* (2006.01)
*H01M 4/62* (2006.01)
(Continued)

(52) U.S. Cl.
CPC ............... *H01M 4/485* (2013.01); *C01D 15/02* (2013.01); *H01M 4/366* (2013.01); *H01M 4/62* (2013.01); *H01M 4/049* (2013.01); *H01M 4/1391* (2013.01); *H01M 4/36* (2013.01); *H01M 4/405* (2013.01); *H01M 4/48* (2013.01); *H01M 10/0525* (2013.01);
(Continued)

(58) Field of Classification Search
CPC ...... C01D 15/02; H01M 4/049; H01M 4/391; H01M 4/36; H01M 4/366; H01M 4/405; H01M 4/48; H01M 4/485; H01M 4/621; H01M 10/0525; H01M 10/04235
See application file for complete search history.

(56) References Cited

U.S. PATENT DOCUMENTS

| 5,219,677 A | 6/1993 | Labat et al. |
| 2012/0100402 A1* | 4/2012 | Nesper .................. H01M 4/131 429/48 |

(Continued)

FOREIGN PATENT DOCUMENTS

EP 2 445 049 A1 4/2012

OTHER PUBLICATIONS

Extended European Search Report issued in corresponding application 13176170, completed Dec. 11, 2013 and mailed Dec. 18, 2013.
(Continued)

*Primary Examiner* — Scott J Chmielecki
(74) *Attorney, Agent, or Firm* — Oblon, McClelland, Maier & Neustadt, L.L.P.

(57) ABSTRACT

A method is described to prepare a cathode material for high energy density rechargeable lithium ion batteries based on $H_2V_3O_8$ with improved cycling stability by means of a surface modification produced at low temperature in aqueous media. The battery comprises a stack composed by an anode, an electrolytic layer, a separator and a cathode, whose material is based on a mixture of carbon black $Li_xH_{2-x}V_3O_8$ modified by an aluminum hydroxide coating achieved in a one pot multistep reaction using aluminum in an amount comprised between 0.5 wt % and 10 wt %.

25 Claims, 9 Drawing Sheets (51) Int. Cl.

| H01M 4/1391 | (2010.01) |
|---|---|
| H01M 4/36 | (2006.01) |
| H01M 4/40 | (2006.01) |
| H01M 4/04 | (2006.01) |
| H01M 4/48 | (2010.01) |
| H01M 10/0525 | (2010.01) |
| H01M 10/42 | (2006.01) |

(52) U.S. Cl.
CPC .......... *H01M 10/4235* (2013.01); *Y02E 60/122* (2013.01)

(56) References Cited

U.S. PATENT DOCUMENTS

| 2013/0216903 A1* | 8/2013 | Pitteloud ................ C01G 31/00 429/211 |
|---|---|---|
| 2014/0178763 A1* | 6/2014 | Mettan ................ H01M 4/0471 429/231.5 |

OTHER PUBLICATIONS

Legagneur V et al: "Lithium insertion/deinsertion properties of new layered vanadium oxides obtained by oxidation of the precursor H2V3O8", Electrochimica Acta, Elsevier Science Publishers, Barking, GB, vol. 47, No. 7, Jan. 11, 2002, pp. 1153-1161.

Zhang Y et al: "Hydrothermal synthesis, 1-16 characterization, formation mechanism and electrochemical property of V3O7.H20 single-crystal nanobelts", Materials Science and Engineering B, Elsevier Sequoia, Lausanne, CH, vol. 175, No. 2, Nov. 25, 2010, pp. 164-171.

C. Delmas, H. Cognac-Auradou, J.M. Cocciantelli, M. Ménétrier, J.P. Doumerc, "The LixV2O5 system: An overview of the structure modifications induced by the lithium intercalation," Solid State Ion. 69 (1994) 257.

Y.P. Mettan, ETH Zürich 2011, PhD Thesis, "H2V3O8—Electroactive Material for Lithium Batteries and Template for the Synthesis of Functional Nanomaterials."

S. Jouanneau, A. Verbaere, S. Lascaud, D. Guyomard, Solid State Ion. 177 "Improvement of the lithium insertion properties of Li1.1V3O8," (2006) 311.

J. Prado-Gonjal, B. Molero-Sánchez, D. Ávila-Brande, Emilio Morán, J.C. Pérez-Flores, A. Kuhn, F. García-Alvarado, "The intercalation chemistry of H2V3O8 nanobelts synthesised by a green, fast and cost-effective procedure," J. Power Sources 232 (2013) 173.

H. Li, T. Zhai, P. He, Y. Wang, E. Hosono an H. Zhou, "Single-crystal H2V3O8 nanowires: a competitive anode with large capacity for aqueous lithium-ion batteries." J. Mater. Chem. 2011, 21, 1780.

C. Li, H.P. Zhang, L.J. Fu, H. Liu, Y.P. Wu, E. Tahm, R. Holze, H.Q. Wu, Electrochim. Acta 51 "Cathode materials modified by surface coating for lithium ion batteries," (2006) 3872-3883.

\* cited by examiner

SURFACE MODIFIED LITHIATED $H_2V_3O_8$

This application claims priority from European Patent Application No. 13161096.6 filed Mar. 3, 2013 and European Patent Application No. 13176170.2 of Jul. 11, 2013, the entire disclosure of which is incorporated herein by reference.

FIELD OF THE INVENTION

The invention relates to the field of high energy density lithium ion batteries. It especially concerns improved cathode materials, in particular surface modified $Li_xH_{2-x}V_3O_8$ cathode material.

BACKGROUND OF THE INVENTION

Vanadium oxides have attracted great interest for the positive electrode in lithium ion batteries over the past few decades. Among them, $V_2O_5$ was initially pointed as a very promising cathodic electro active material due to its low atomic mass, high oxidation number of vanadium (V) and easiness of synthesis in an industrial scale [1]. While close to three lithium equivalents can be inserted into the $V_2O_5$ crystal lattice when the battery is first discharged down to 2 V, less than two lithium equivalents can actually be quasi-reversibly intercalated into the structure [2]. This fact hindered the dissemination of this compound as a standard for mass production cathodes so far. However, research continued on other vanadium oxide structures like $Li_xV_3O_8$ and $H_2V_3O_8$. Both of these cathodic materials are promising candidates for commercial lithium ion batteries but stability issues on long term cycling are still to be solved [3, 4].

It has already been shown that up to four lithium equivalents (ca. 400 Ah/kg) can be intercalated in $H_2V_3O_8$ between 4.2 V and 1.5 V vs. Li/Li$^+$ [3, 5] with a mean potential close to 2.7 V. This leads to a specific energy density higher than 1 kWh/kg which shows by its own the great potential associated to this compound for lithium ion batteries. For instance, the theoretical energy density associated to commercially available lithium ion cathodes like iron, cobalt and/or manganese oxides or phosphates is in the range of 0.5 kWh/kg. The practical capacity measured in such systems, however, is lower than the reported theoretical value.

In a previous co-owned published patent application [6], the synthesis of $H_2V_3O_8$ and electrode preparation with graphene oxide was explored. The present invention represents a new approach to increase the cathodic charge retention during cycling by surface decoration with aluminum hydroxide.

Conversely to the majority of the current generation cathodes for lithium ion batteries, $H_2V_3O_8$ shows low thermal stability. It is known that structural water present in this compound (also written as $V_3O_7.H_2O$) is released when heated above 200° C. [2, 7]. It is generally accepted that the anhydrous material is obtained at a temperature close to 350° C. This property limits the choice of possible compounds to coat the surface of $H_2V_3O_8$. Several metal oxides like MgO, $Al_2O_3$, $SiO_2$, $TiO_2$, ZnO, $SnO_2$, $ZrO_2$, glasses and phosphates, for example, have been extensively studied as surface coatings for lithium ion cathodes. It has been reported that these coatings prevent the direct contact from the intercalation compound with the electrolytic solution, suppress undesirable phase transitions, improve the structural stability, and decrease the disorder of cations in crystal sites. As a result, side reactions and heat generation during cycling can be decreased [8]. However, either due to processing limitations related to solvent and pH compatibility or thermal stability of $H_2V_3O_8$, the common wet and solid state chemistry methods used to coat or decorate the surface of cathodic materials with the referred metal oxides are not suited for $H_2V_3O_8$.

Thus, the object of the invention was to increase the capacity retention of the lithium intercalation under charge and discharge cycling of the $H_2V_3O_8$ compound as lithium ion battery cathode.

SUMMARY OF THE INVENTION

The present invention provides a cathode material for rechargeable lithium ion battery with improved cycling stability obtained by surface modification with $Al(OH)_3$, performed at low temperature in aqueous media. Dependent on its thickness, this surface modification with $Al(OH)_3$ is termed coating or decoration. In the scope of this invention, a coating is a thick layer covering the entire surface of a particle of electro active material while a decoration is a (usually thinner) layer that forms a partial coating only, i.e. does not cover the entire surface.

Thus, one object of the present invention is a method for preparing an at least partially stabilized electro active cathode material (EAM) for rechargeable lithium ion batteries based on $Li_xH_{2-x}V_3O_8$ by applying a coating/decoration of $Al(OH)_3$.

Usually the coating/decorating step is performed in that a soluble aluminum source, preferably an aluminum salt hydrate, is added to a suspension comprising chemically lithiated $H_2V_3O_8$, followed by addition of a base up to a pH of 7 to 8. A suitable base is simultaneously a Brønsted and a Lewis base, i.e. is simultaneously able to raise the pH and to complex the Lewis acid Al (III), in particular aqueous ammonia. This step preferably is performed in aqueous media at low temperature, i.e. below 100° C., such as 70 to 90° C., preferably about 80° C.

In general the suspension comprising chemically lithiated $H_2V_3O_8$, is formed in situ from $H_2V_3O_8$, a lithium source and a reducing agent as described in [6] and is used without any separation and/or purification step. It is also within the scope of the present invention to provide the $Al(OH)_3$ coated/decorated EAM with a graphene layer as described in [6].

The rechargeable lithium ion cell is formed by an assembled stack composed of a cathode, a separator, an electrolytic layer and an anode. Suitable anode materials include e.g. lithium, lithium alloys, $Li_xC_6$, silicides and nano-silicon-based materials. The electrolytic layer preferably includes a spacer and an aprotic solvent or a mixture of aprotic solvents with dissolved lithium salt. A suitable spacer is a foam filled with electrolyte.

A battery may be made up of several stacks and is sealed in a container.

The cathode material is essentially composed of the modified $Li_xH_{2-x}V_3O_8$ and carbon black. The use of a binder is possible, but not compulsory. A cathode is formed by coating a current collector with such cathode material.

$Li_xH_{2-x}V_3O_8$ retains the $H_2V_3O_8$ structure (Pnam). In this compound x is ranging from 0.1 to 1.5 and preferably is close to 1.5. The lithiation process is advantageously performed immediately before the coating/decorating reaction.

$H_2V_3O_8$ is lithiated using at least one Li$^+$ source and a reducing agent. Such Li$^+$ source and reducing agent preferably consists of or contains a reducing lithium salt, much preferred lithium ascorbate.

The $Al(OH)_3$ coating is preferably produced in a one pot multistep reaction starting with phase pure $H_2V_3O_8$ as starting material, followed by a chemical lithiation of the starting material. Subsequently surface coating or decorating with aluminum hydroxide is performed.

In a preferred embodiment, $Al(OH)_3$ is generated from an aluminum salt hydrate, e.g. a salt selected from $Al(NO_3)_3 \cdot 9H_2O$, $AlCl_3 \cdot 6H_2O$ or $Al_2(SO_4)_3 \cdot 18H_2O$, preferably $AlCl_3 \cdot 6H_2O$ or $Al(NO_3)_3 \cdot 9H_2O$. The hydroxide is generated in situ by addition of a base that is simultaneously a Brønsted and a Lewis base, preferably aqueous ammonia ($NH_3$). Usually the ratio of Al(III):$NH_3$ is about 1:1.

The amount of aluminum used should be comprised between 0.5 wt % and 10 wt %, preferably between 1 and 3 wt %, more preferred between 1 and 2%, and most preferred about 1.5 wt % referred to $H_2V_3O_8$.

Since the reaction is preferably performed such that the $Al(OH)_3$ is deposited on the EAM and not precipitated in the solution, the amount used essentially corresponds to the amount of the coating/decoration and the thickness of the coating can be adjusted by the amount of aluminum used for performing the reaction.

Since the coating/decorating preferably is performed in a one pot method, it is assumed that the $Al(OH)_3$ coating/decoration may comprise some impurities like ascorbate (if Li ascorbate is used for lithiation) or $NH_3$ (if $NH_3$ is used as base) or AlO(OH).

A lithium ion battery assembled with such cathodic intercalation material shows higher stability over 200 cycles compared to the uncoated $Li_xH_{2-x}V_3O_8$. For instance, after 200 charge and discharge cycles between 4.05 and 2.2 V vs. Li/Li$^+$ at a rate of 100 A/kg, the $Al(OH)_3$ coated $Li_xH_{2-x}V_3O_8$ with an Al amount of 1.5 wt. % referred to $H_2V_3O_8$ shows a capacity retention of 89% compared to 67% of the uncoated $Li_xH_{2-x}V_3O_8$.

Without wanting to be bound by any attempt to interpret the effect, it is assumed that the $Al(OH)_3$ coating or decoration inhibits vanadium dissolution during cycling either by increasing the structural stability of the fibers and/or by surface passivation.

BRIEF DESCRIPTION OF THE DRAWINGS

To better understand the disclosure of the invention, a series of drawings is presented.

DETAILED DESCRIPTION OF THE INVENTION

The deposition of an amorphous $Al(OH)_3$ coating film on the surface of the EAM in aqueous media at low temperature is an additional step during the chemical lithiation of $H_2V_3O_8$ using a Li$^+$ source together with a reducing agent, in particular a reducing agent with a redox potential close to the one of ascorbic acid/ascorbate. A presently much preferred lithium source and reduction agent is lithium ascorbate. The whole process consists of a multistep one pot reaction where the $H_2V_3O_8$ fibers are first at least partially and preferably partially lithiated and then coated/decorated. A full surface coverage with the $Al(OH)_3$ thin film can be achieved with higher aluminum contents while surface decorations are obtained with lower aluminum contents. For the coating/decorating step, a soluble aluminum source (an aluminum salt hydrate) is added to the suspension prepared in situ from $H_2V_3O_8$, a lithium source and a reducing agent. The coating/decorating reaction is then induced by the addition of a diluted ammonia solution and takes place at pH comprised between 7 and 8. However, it was noticed that either the presence of remaining organic species from the lithiation step or the reduced EAM surface, showing higher concentration of vanadium (IV) species compared to bare temperature stabilized EAM, have a considerable influence on the homogeneity of the $Al(OH)_3$ surface coverage and consequently on the electrochemical performance.

EXAMPLE 1

Synthesis of $H_2V_3O_8$

The phase pure $H_2V_3O_8$ fibers may be prepared following the method described in the co-owned published United States patent application US 2012/0100402 A1 [6]: 3 g of $VOSO_4.5H_2O$ were dissolved in 50 mL deionized water. 2 mL of 25 wt. % ammonia ($NH_4OH$) were then added to the previous suspension. The dense precipitate which formed immediately was filtered and the grey wet solid product collected, put in a TEFLON® vessel of an autoclave and dispersed in 400 mL distilled water. After addition of 1 mL 12 M HCl, the autoclave was sealed and the suspension treated hydrothermally for 48 h at 220° C. At the end of the reaction, the green to green-yellow solid product was filtered, washed with water and isopropanol and dried overnight at 100° C. in air. 750 mg of $H_2V_3O_8$ were obtained by such method. The vanadium yield equaled 70%.

EXAMPLE 2

One Pot Chemical Lithiation and $Al(OH)_3$ Surface Coating

The chemical lithiation of the $H_2V_3O_8$ fibers prepared as described in the example 1 was performed using lithium ascorbate as a reducing and complexation agent in aqueous media at ambient temperature.

At first, a solution containing ascorbic acid and the lithium salt, preferably LiOH, was prepared. 30 mg (0.17 mmol) of ascorbic acid (Sigma Aldrich L-Ascorbic acid 99%) were dissolved in 15 mL MilliQ water (18.2 MΩ cm) and 15 mg $LiOH.H_2O$ (Alfa Aesar monohydrate 56.5% min.) (0.20 mmol min.) were then added. For sufficient proton exchange, the solution was stirred until the pH stabilized, usually for about 30 minutes. This solution will be called S1, onwards.

A second suspension, named S2, containing 100 mg of the green $H_2V_3O_8$ fibers dispersed in 50 mL MilliQ water was prepared. The pH of this suspension was close to 4.

The lithium ascorbate solution (S1) was subsequently added to the suspension containing the $H_2V_3O_8$ compound (S2). Thereby the pH of S2 was neutralized due to the excess of lithium hydroxide in S1. After a few minutes under stirring, the pH decreased from 10 to a value close to 7. The suspended fibers now showed a bluish color (suspension S3) which indicates that to some extent the vanadium oxidation state was reduced from vanadium (V) to vanadium (IV). Considering the charge balance in the compound, this fact is an indication that $Li^+$ was incorporated in the $H_2V_3O_8$ structure. This color change—or rather the absence of further color change—is an indication that the lithiation reaction has been completed. To this reaction media (S3), the desired amount of a hydrated aluminum salt, e.g. $AlCl_3.6H_2O$ or $Al(NO_3)_3.9H_2O$, was added as solid. The amount of aluminum used in the synthesis of the different coatings/decorations is indicated in the Table 1.

TABLE 1

Amount of aluminum used for the different coating compositions.

| | $H_2V_3O_8$ (mg) | Al(III) (mole) |
|---|---|---|
| $Li_xH_{2-x}V_3O_8$ | 100 | — |
| $Li_xH_{2-x}V_3O_8$ 0.5 wt. % Al | 100 | $1.9 \times 10^{-5}$ |
| $Li_xH_{2-x}V_3O_8$ 1.5 wt. % Al | 100 | $5.6 \times 10^{-5}$ |
| $Li_xH_{2-x}V_3O_8$ 3 wt. % Al | 100 | $1.1 \times 10^{-4}$ |

Upon addition of solid aluminum salt to the suspension S3, the pH dropped to a value comprised between 4.5 and 6 depending on the amount of aluminum salt added. Afterwards, this suspension was heated up to 80° C. and a 0.1 M ammonia solution, having a (aluminum (III)/$NH_3$) molar ratio equal to 1, was added drop wise. The pH increased to a value between 7 and 8. After 2 h under stirring, the pH of the suspension reached a stable value between 6 and 7. The suspension was then filtered and washed once with water. The filtered compound was finally dried at 85° C. before being heat treated for 1 h at 180° C. in air.

Figure 1A:
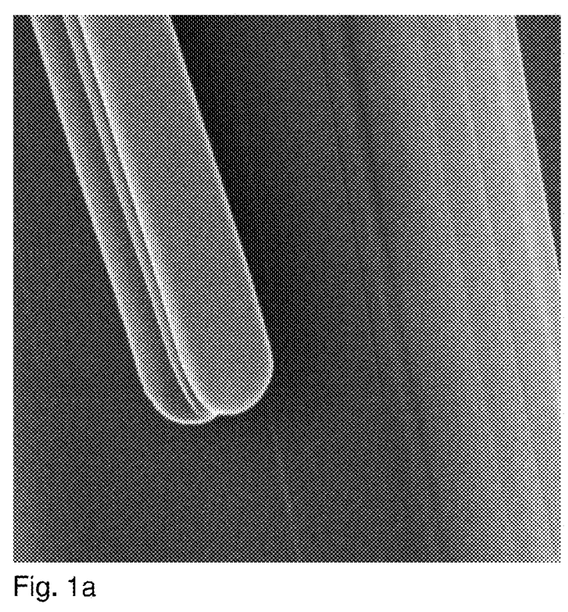
FIG. 1a: Helium ion microscopy micrograph of the uncoated $H_2V_3O_8$ fibers.
Figure 1B:
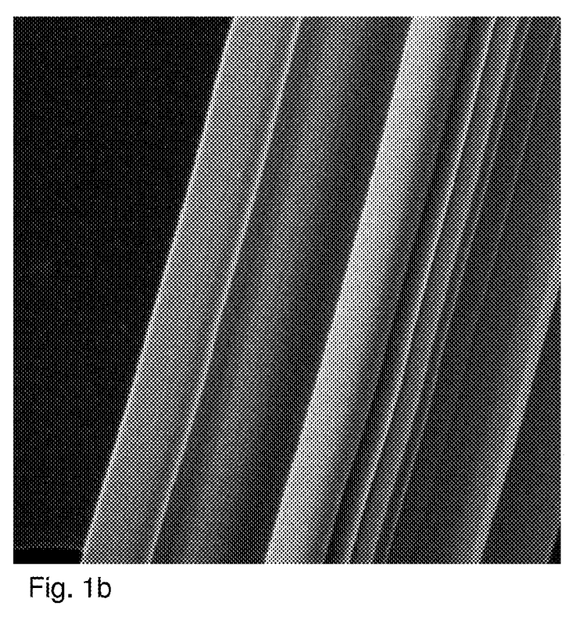
FIG. 1b: Helium ion microscopy micrograph of the $Li_xH_{2-x}V_3O_8$ fibers coated with 1.5 wt. % Al.
Figure 1C:
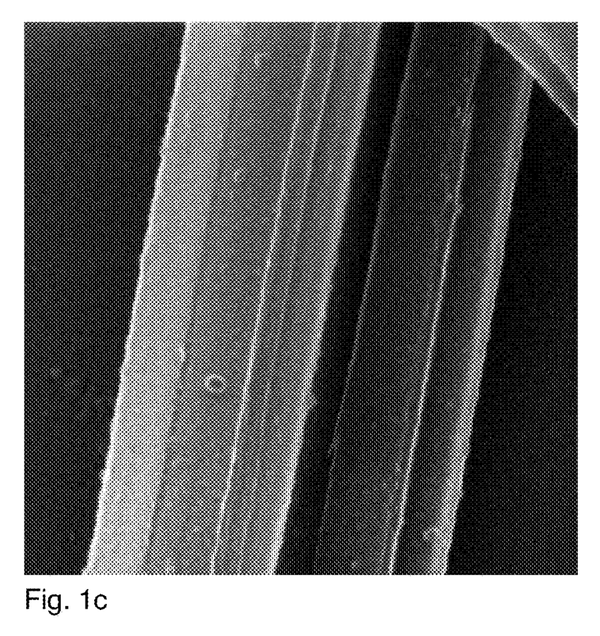
FIG. 1c: Helium ion microscopy micrograph of the $Li_xH_{2-x}V_3O_8$ fibers coated with 3 wt. % nominal Al.
Figure 2A:
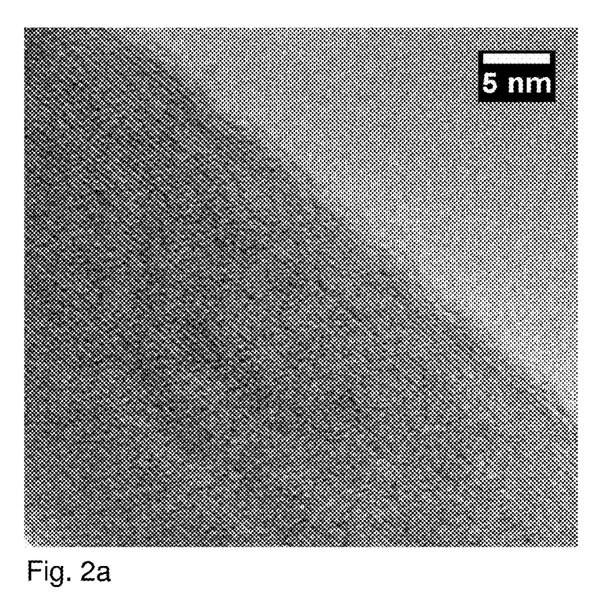
FIG. 2a: HRTEM micrograph of the $Li_xH_{2-x}V_3O_8$ fibers coated with 0.5 wt. % nominal Al.
Figure 2B:
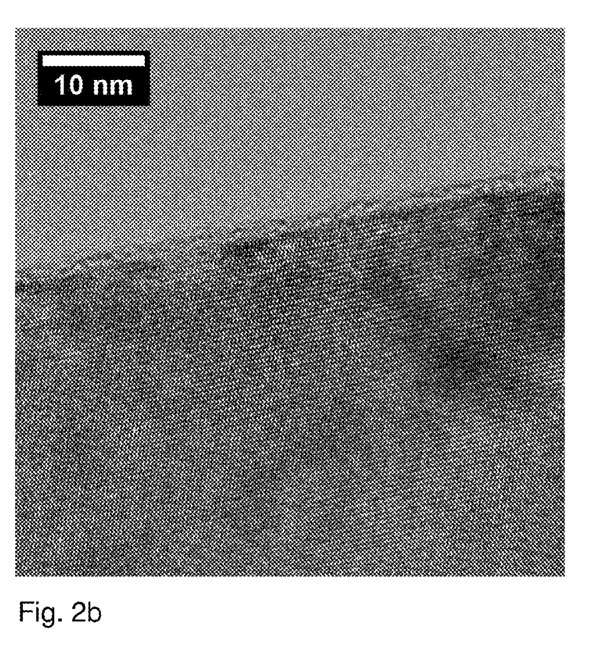
FIG. 2b: HRTEM micrograph of the $Li_xH_{2-x}V_3O_8$ fibers coated with 1.5 wt. % nominal Al
Figure 2C:
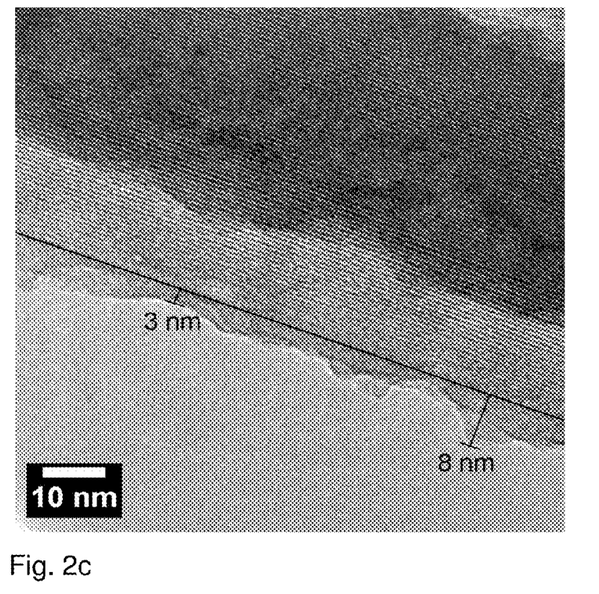
FIG. 2c: HRTEM micrograph of the $Li_xH_{2-x}V_3O_8$ fibers coated with 3 wt. % nominal Al
Figure 3A:
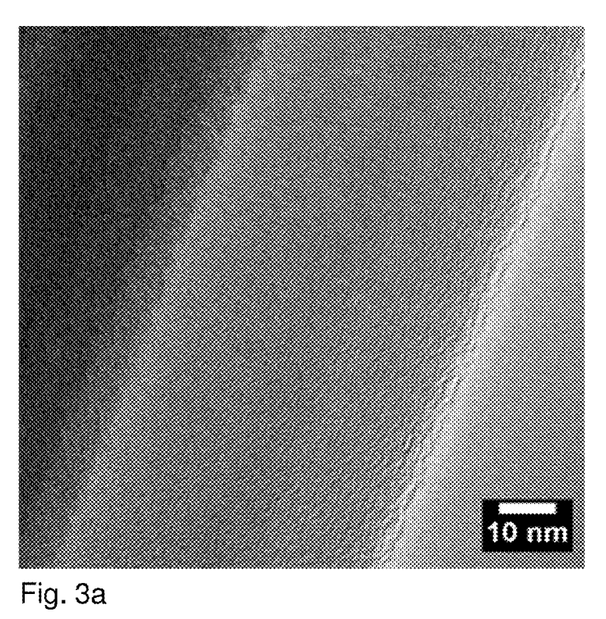
FIG. 3a: HRTEM micrograph of a representative zone of the $Li_xH_{2-x}V_3O_8$ coated with 1.5 wt. % nominal aluminum sample.
Figure 3B:
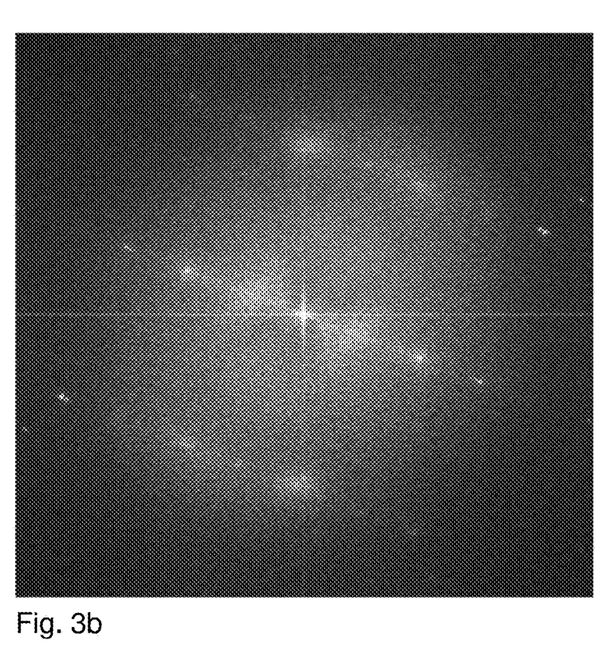
FIG. 3b: Fast Fourier Transform of the HRTEM micrograph shown if FIG. 3a showing amorphous background superimposed to the $H_2V_3O_8$ crystal structure.
Figure 3C:
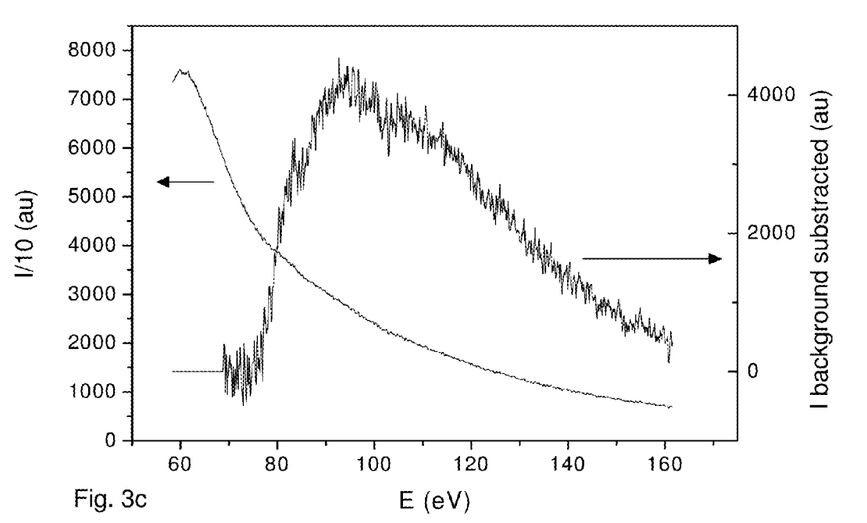
FIG. 3c: EELS on the Al L2/3 edge of the HRTEM shown if FIG. 3a. Left Y axis indicates the I/10 measured signal. Right Y axis represents the measured signal with subtracted background. It clearly shows the Al L2/3 edge appearing at ca. 70 eV.
Figure 3D:
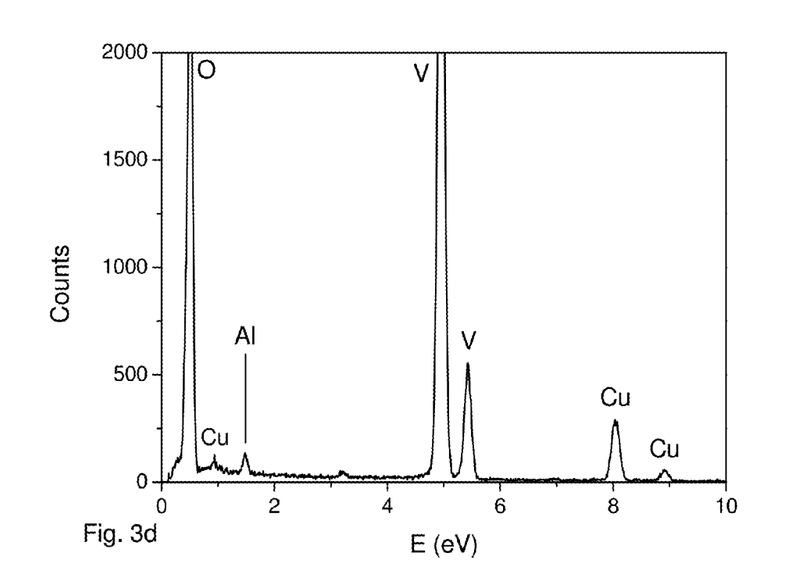
FIG. 3d: EDX spectrum of the HRTEM shown if FIG. 3a. The Cu is a trace element coming from the Cu grids used for TEM sample preparation. 1.2 at. % aluminum was measured.
Figure 4:
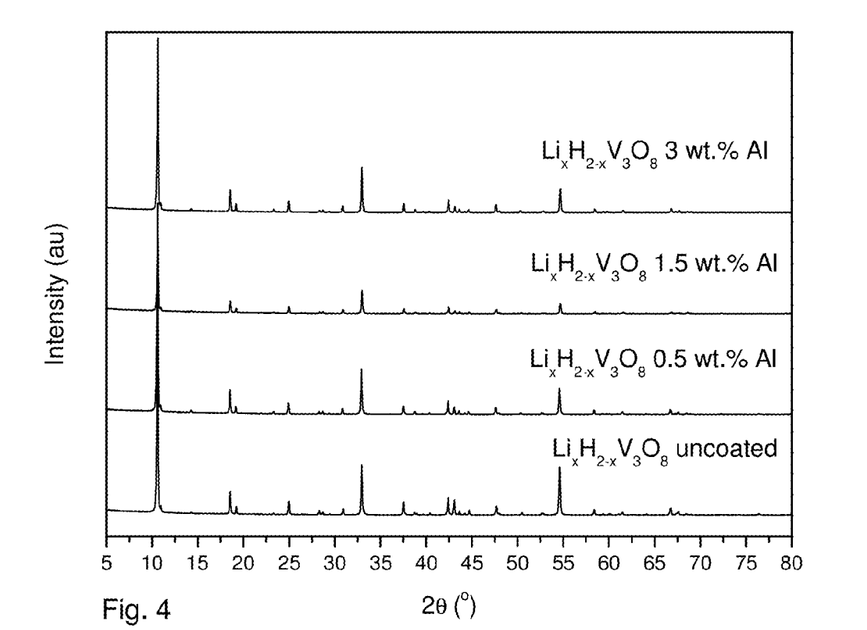
FIG. 4: XRD of coated, decorated and uncoated $Li_xH_{2-x}V_3O_8$ fibers. The only crystalline structure detected is the one of $H_2V_3O_8$, indicating an amorphous $Al(OH)_3$ surface film.

FIGS. 1a, 1b and 1c show the surface roughness of the uncoated fibers and those decorated/coated with 1.5 wt. % and 3 wt. % aluminum. The images were obtained using a Helium ion microscope. Although only a minor change in surface roughness can be discerned between the uncoated and 1.5 wt. % Al samples, a clear homogenous coverage of the surface of the fibers was identified in the 3 wt. % Al sample (FIG. 1c). High magnification images of the surface obtained by HRTEM are shown in FIGS. 2a, 2b and 2c. It can be seen that the surface of the 0.5 and 1.5 wt. % aluminum compounds is rough but no clear coated layer can be identified from HRTEM images on the lower content aluminum coatings. To further understand the presence of the aluminum on the $Li_xH_{2-x}V_3O_8$ surface, EELS and EDX analysis were conducted on the $Li_xH_{2-x}V_3O_8$—1.5 wt. % Al compound. The results are shown on FIG. 3c and FIG. 3d. The analysis performed on the zone shown in FIG. 3a, allowed to detect the Al $L_{2,3}$ edge in the EELS spectra revealing the presence of aluminum. This result is confirmed by the EDX analysis where ca. 1.2 wt. % Al could be measured. A clear coverage of the $Li_xH_{2-x}V_3O_8$ surface by amorphous $Al(OH)_3$ can be seen on the 3 wt. % aluminum composition. The morphology of this coating is uniform as confirmed by the images present in FIG. 1c and FIG. 2c. A rough thin layer covers the surface, with the $Al(OH)_3$ film thickness ranging from 3 to 10 nm. The influence of the coating thickness and surface coverage on the electrochemical performance of the EAM will be discussed later in this text. No identifiable crystalline structure changes of the EAM was induced by the coating, independently of the amount of aluminum used. No additional crystalline phase could be detected by X-ray diffraction, although 3 wt. % of a crystalline Al phase should give a signal. Results are show in FIG. 4. The crystalline structure of the EAM was identifiable in all samples, but no ordered structure could be seen by transmission electron microscopy of the aluminum decoration. This is a strong indication that the aluminum structure is amorphous. Also, the electron diffraction pattern of the $Li_xH_{2-x}V_3O_8$—1.5 wt. % Al compound shown in FIG. 3b revealed a strong amorphous contribution superimposed to the EAM crystal structure, which is absent without Al coating. This fully agrees with the XRD data.

To further comprehend the aluminum distribution on the samples, low magnification SEM/EDX allows characterizing the bulk composition of the compounds. Also, XPS analysis on the uncoated and 3 wt. % aluminum compound was performed. Results are summarized in Table 2. EDX results indicate that the yield of the coating reaction is close to 40%. A very high aluminum surface concentration is confirmed by XPS on the 3 wt. % aluminum compound.

TABLE 2

XPS and SEM-EDX surface and bulk element composition of coated and uncoated samples.

|  | XPS | | | SEM-EDX (bulk 5k x mag.) | | |
| --- | --- | --- | --- | --- | --- | --- |
|  | O at. % | V at. %. | Al at. % | O at. % | V at. %. | Al at. % |
| $Li_xH_{2-x}V_3O_8$ | 71.9 | 28.1 | 0 | — | — | — |
| $Li_xH_{2-x}V_3O_8$ 0.5 wt. % Al | — | — | — | 66.9 | 32.9 | 0.2 |
| $Li_xH_{2-x}V_3O_8$ 1.5 wt. % Al | — | — | — | 65.5 | 33.9 | 0.6 |
| $Li_xH_{2-x}V_3O_8$ 3 wt. % Al | 66.2 | 14.4 | 19.4 | — | — | — |

Figure 5:
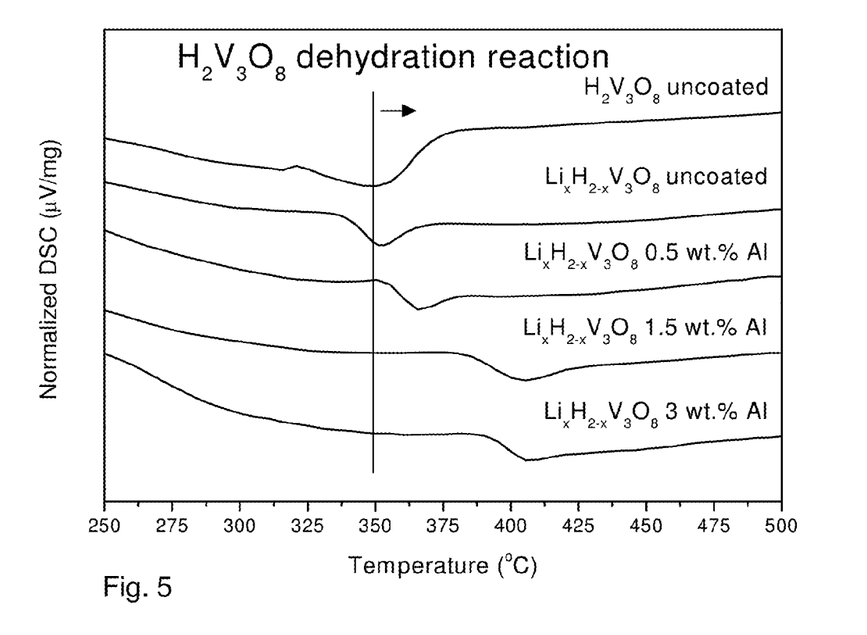
FIG. 5: Normalized DSC of coated, decorated and uncoated $Li_xH_{2-x}V_3O_8$. Influence of the $Al(OH)_3$ surface coating on the $H_2V_3O_8$ fibers dehydration temperature: dehydration temperature increases with increased amount of aluminum. Coating has a direct influence on the thermal stabilization of the $Li_xH_{2-x}V_3O_8$ fibers. Experimental conditions: heating ratio: $7.5°$ C. $\min^{-1}$; synthetic air: 50 mL $\min^{-1}$.

Only aluminum traces were detected on the lower aluminum content coatings presumably indicating a not full surface coverage. This assumption is supported by the local EDX analysis of the FIG. 3*d* where a higher content could be measured compared to the bulk. However, it seems that even a small amount of aluminum has a considerable effect on the thermal stability. FIG. 5 shows the normalized differential scanning calorimetry curves obtained with pristine $H_2V_3O_8$, $Li_xH_{2-x}V_3O_8$ and $Al(OH)_3$ coated $Li_xH_{2-x}V_3O_8$ compounds. A clear shift towards higher temperatures for the dehydration reaction was observed on the coated samples. This reaction can be described as [2, 7]:

$$H_2V_3O_8 \rightarrow V_3O_7 + H_2O$$

Under synthetic air the temperature in which the dehydration reaction occurs increased for approximately 50° C. for the materials coated with 1.5 wt. % and 3 wt. % aluminum amount used, confirming the influence of the surface modification on the structural stability of the material.

The degree of aluminum hydroxide surface coverage and film thickness can be adjusted in a nonlinear manner by the amount of aluminum in the deposition reaction.

EXAMPLE 3

Electrochemical Performance of Coated/Decorated and Uncoated Samples

Batteries were made to characterize electrochemically the stability of the cathodic storage materials. To prepare each battery, 20 mg of coated/decorated or uncoated $Li_xH_{2-x}V_3O_8$ compound were first dispersed ultrasonically in 5 mL THF (Alfa Aesar 99%). 10 mg of Carbon black (Super P® from TIMCAL) were then added and ultrasonically mixed for a few minutes until a dark homogenous suspension was obtained allowing the carbon and the EAM to be intimately mixed. Half of the suspension volume was transferred to a mortar and gently stirred with a pestle. The THF evaporation resulted in a thick paste. This paste containing the EAM was then transferred to an aluminum current collector, pressed with paper sheet to absorb remaining THF and allowed to dry in air before performing a heat treatment at 180° C. for 10 minutes under air. Close to 4 mg of EAM were deposited on the current collector by this process. The batteries were assembled in an argon filled glove box (<0.1% $H_2O$ and <0.1% $O_2$) by building a vertical stack composed by the aluminum current collector containing the EAM, a polypropylene Celgard separator, a silica foam spacer filled with Merck® LP 50 electrolyte (1M $LiPF_6$ in EC/EMC 1:1), and a metallic lithium anode. The stack is contained inside a well tighten stainless steel cell.

The batteries assembled as described were subjected to galvanostatic charge/discharge cycles between 4.05 V and 2.2 V vs. $Li/Li^+$ at a current rate of 100 A/kg.

Figure 6:
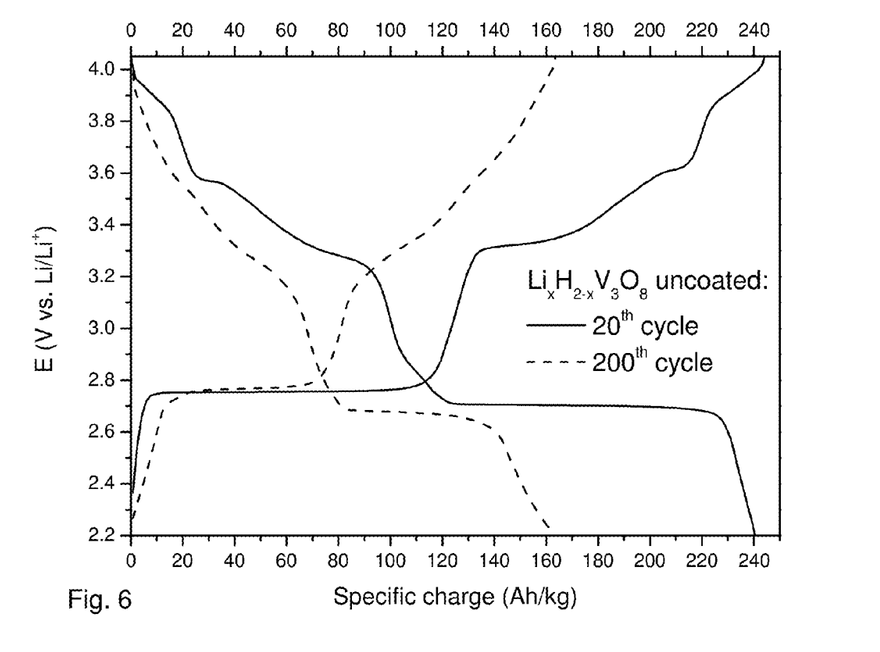
FIG. 6: Charge and discharge curves on the $20^{th}$ and $200^{th}$ cycle between 4.05 V and 2.2 V vs. Li/Li$^+$ at a rate of 100 A/kg of the cell assembled with uncoated $Li_xH_{2-x}V_3O_8$ cathode, prepared as described in example 3.

FIG. 6 shows the variation in the battery voltage as a function of the intercalated lithium in the uncoated $Li_xH_{2-x}V_3O_8$ cathode for the $20^{th}$ and $200^{th}$ cycles. On the $20^{th}$ cycle, a specific charge of 240 Ah/kg was measured for this compound. Close to 2.5 mole of lithium atoms were intercalated per mole of EAM during the discharge between 4.05 V and 2.2 V vs. $Li/Li^+$. Typical voltage profiles of $H_2V_3O_8$ were registered under charge/discharge where several voltage plateaus can be seen. The coulombic efficiency between discharge and charge was close to 98.7% on $20^{th}$ cycle and increased with the number of cycles to 99.4% on the $200^{th}$ cycle. However, the increase in the number of cycles led to a degradation of the electrode performance and on the $200^{th}$ cycle, a capacity of 162 Ah/kg remained. This value indicates that only 1.7 mole of lithium atoms are now intercalated per mole of EAM representing a capacity retention of 67% between the $20^{th}$ and $200^{th}$ cycles. Also, the decrease in the specific charge was uniformly distributed over the entire potential range. Interestingly, the capacity retention in the high potential region, above 2.7 V, was identical to the one measured between 2.7 and 2.2 V vs. $Li/Li^+$. In both cases, 67% of the capacity measured on the $20^{th}$ cycle was available on the $200^{th}$.

Figure 7:
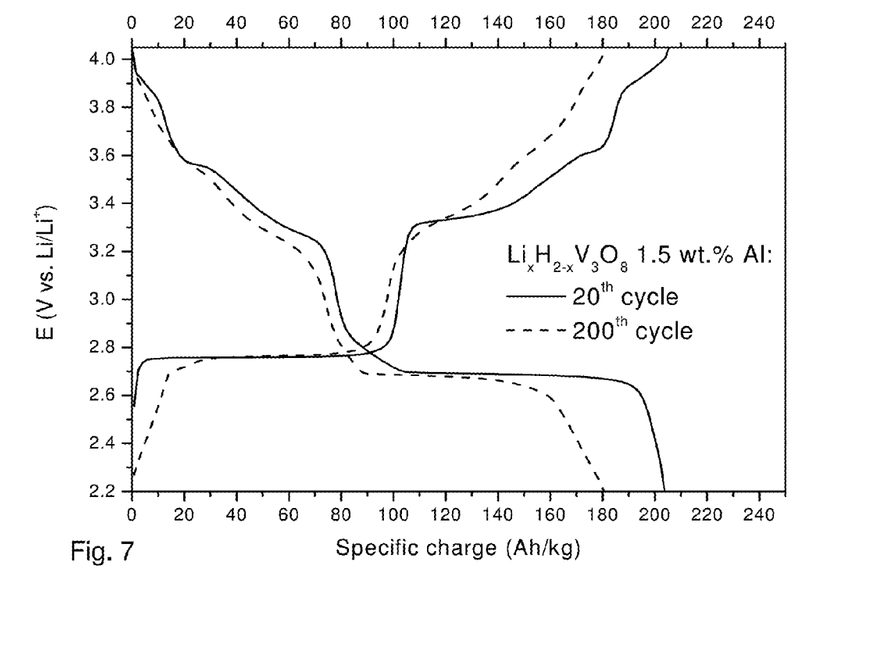
FIG. 7: Charge and discharge curves on the $20^{th}$ and $200^{th}$ cycle between 4.05 V and 2.2 V vs. Li/Li$^+$ at a rate of 100 A/kg of the cell assembled with $Li_xH_{2-x}V_3O_8$ cathode $Al(OH)_3$ coated with 1.5 wt. % Al, prepared as described in example 3.
Figure 8:
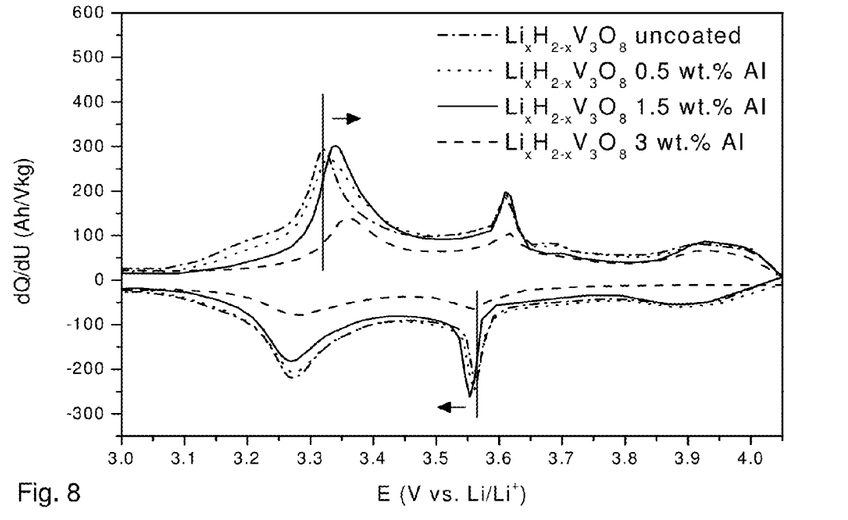
FIG. 8: Differential capacity (specific charge) curves calculated from the galvanostatic charge and discharge curves on the $100^{th}$ cycle of the coated and uncoated samples of the example 3. Small polarization induced by the surface coating is present on samples containing 1.5 and 3 wt. % Al.

FIG. 7 is similar to FIG. 6 showing the voltage profiles registered on $Li_xH_{2-x}V_3O_8$ decorated with nominal 1.5 wt % aluminum. On the $20^{th}$ cycle, a lower specific charge (ca. 203 Ah/kg) was measured for this compound compared to the uncoated EAM, which means that around 15% less lithium atoms were intercalated in the structure. However, the capacity retention after 200 cycles compared to the $20^{th}$ cycle was close to 89% which was much higher than for the uncoated fibers. After 200 cycles, the $Li_xH_{2-x}V_3O_8$—1.5 wt. % Al compound could still intercalate 2 mole of lithium atoms per mole of $H_2V_3O_8$ compared to 1.7 of the uncoated compound. Almost no difference was noticed in the voltage profiles of the uncoated and 1.5 wt. % aluminum decorated compounds as can be seen in FIG. 6 and FIG. 7. Nevertheless, by analyzing the calculated differential capacity curves presented in FIG. 8, it can be seen that a small polarization was induced by the coating. Such polarization is revealed by the shift towards higher potentials of the lithium de-intercalation reaction while charging and vice-versa on discharging, comparing the uncoated and decorated compounds.

Figure 9:
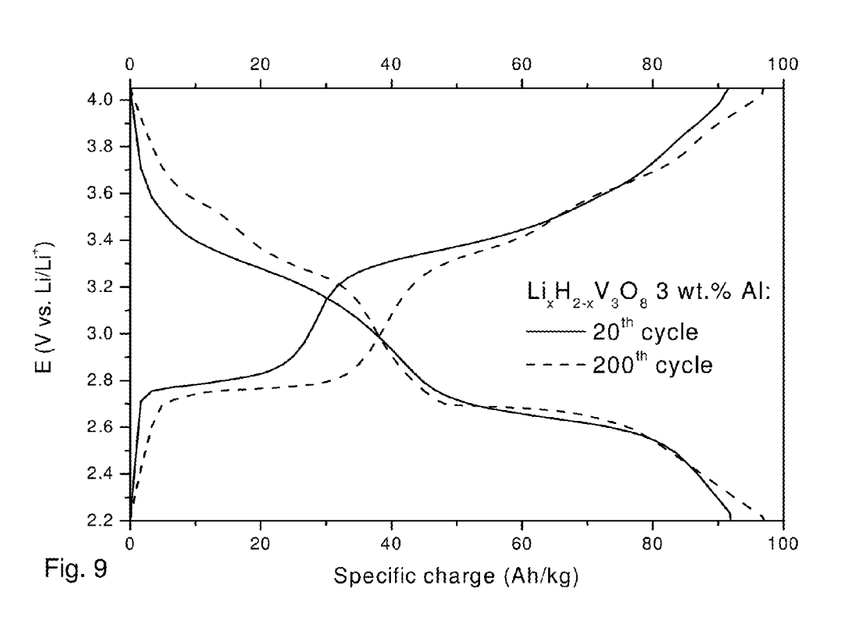
FIG. 9: Shows the charge and discharge curves on the $20^{th}$ and $200^{th}$ cycle between 4.05 V and 2.2 V vs. Li/Li$^+$ at a rate of 100 A/kg of the cell assembled with $Li_xH_{2-x}V_3O_8$ cathode $Al(OH)_3$ coated with 3 wt. % Al, prepared as described in example 3.

The charge and discharge voltage profiles on the $20^{th}$ and $200^{th}$ cycles on $Li_xH_{2-x}V_3O_8$ coated with nominal 3 wt % aluminum are shown in FIG. 9. It is noticed on this plot that the voltage plateaus are less well defined than in the case of the uncoated and lower aluminum content materials possibly due to the increased complexity of the lithium intercalation reaction induced by the thicker coating. Moreover, the capacity involved in the charge and discharge reactions was also lower than that measured on the uncoated $Li_xH_{2-x}V_3O_8$. Only close to 1 mole of lithium atoms per mole of $H_2V_3O_8$ were intercalated in the structure. However, after 200 cycles a 5% increase in the specific charge was registered. Also, the voltage profile curves became better defined indicating that lithium percolation on this compound improved under cycling, especially in the higher potential region.

These results show that such a thick coating considerably affects the specific charge available for the Li intercalation in the EAM structure but it allows for a very high stability under cycling compared to the bare EAM.

Figure 10:
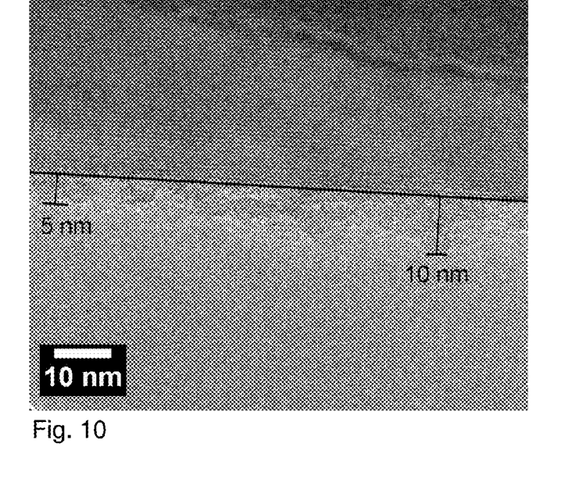
FIG. 10: HRTEM micrograph of the $Li_xH_{2-x}V_3O_8$ fibers $Al(OH)_3$ coated with 3 wt. % Al of the example 3. Imaging of the aluminum hydroxide coating after 200 charge and discharge cycles, showing that the coating remains at the surface during the electrochemical test.

The stability of the amorphous $Al(OH)_3$ coating under electrochemical stress, can be seen from a comparison of the HRTEM images of the 3 wt. % aluminum coated fibers before cycling (FIG. 2c) and after cycling (FIG. 10). These pictures clearly show that the surface coating is stable under the cycling conditions.

Figure 11:
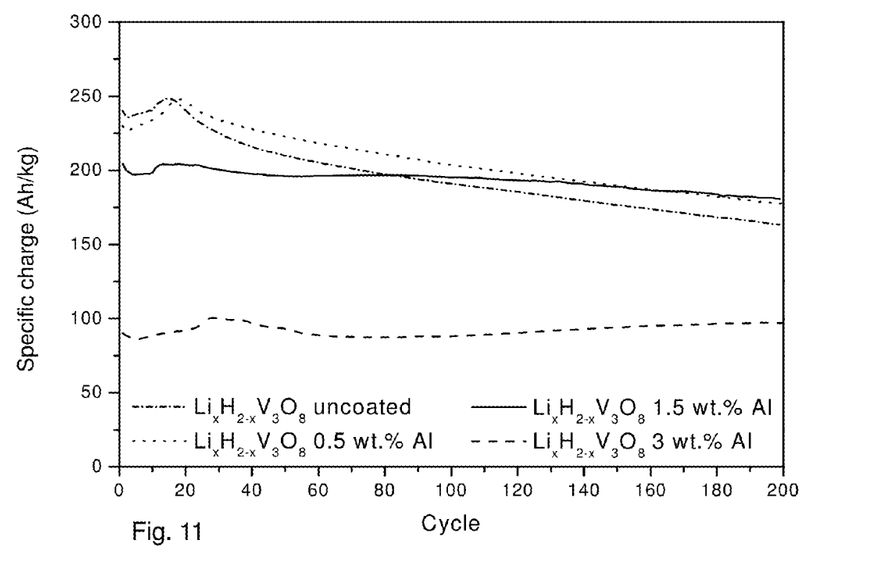
FIG. 11: Plot showing the evolution of the specific charge of the cells assembled as described in the example 3, with different $Al(OH)_3$ contents, as a function of the number of cycles.

FIG. 11 shows the variation of the capacity as a function of the number of cycles in the batteries assembled with uncoated and coated/decorated compounds. The stability under charge and discharge cycles of $Li_xH_{2-x}V_3O_8$ fibers can be increased by means of an $Al(OH)_3$ surface coating/decoration performed in aqueous media at low temperature. The presence of the aluminum hydroxide coating increases the capacity retention of $Li_xH_{2-x}V_3O_8$ under cycling.

Vanadium dissolution and a change in the fibers morphology due to the fracture of the long single crystal nanobelts have been reported as the most likely mechanisms for loss of capacity during cycling on the compound [2]. The decorations/coatings reported in the present invention increases the capacity retention under cycling by influencing the bulk compound in two possible major ways.

1) Increasing structural stability;
2) Limiting vanadium dissolution.

Thermo-gravimetric data corroborates the electrochemical results indicating that the structural stability of $Li_xH_{2-x}V_3O_8$ improves with the coating.

Both the decoration/coating thickness and the surface coverage play an important role for the electrode stability. It is worth notice that these variables also influence the lithium percolation of the electrode which is related to the kinetics of the intercalation/de-intercalation reactions. The fine tuning of the $Al(OH)_3$ decoration/coating morphology, namely the surface coverage and thickness is important to ensure high cycling stability while keeping high lithium percolation and limiting polarization side effects.

LITERATURE

[1]—U.S. Pat. No. 5,219,677.
[2]—C. Delmas, H. Cognac-Auradou, J. M. Cocciantelli, M. Ménétrier, J. P. Doumerc, Solid State Ion. 69 (1994) 257.
[3]—Y. P. Mettan, ETH Zürich 2011, PhD Thesis.
[4]—S. Jouanneau, A. Verbaere, S. Lascaud, D. Guyomard, Solid State Ion. 177 (2006) 311.
[5]—J. Prado-Gonjal, B. Molero-Sánchez, D. Ávila-Brande, Emilio Morán, J. C. Pérez-Flores, A. Kuhn, F. García-Alvarado, J. Power Sources 232 (2013) 173.
[6]—US 2012/0100402 A1.
[7]—H. Li, T. Zhai, P. He, Y. Wang, E. Hosono an H. Zhou, J. Mater. Chem. 2011, 21, 1780.
[8]—C. Li, H. P. Zhang, L. J. Fu, H. Liu, Y. P. Wu, E. Tahm, R. Holze, H. Q. Wu, Electrochim. Acta 51 (2006) 3872.

What is claimed is:

1. A method for preparing a cathode material, comprising the steps of:
    modifying a surface of a chemically lithiated $H_2V_3O_8$ by adding a hydrated aluminum salt to the chemically lithiated $H_2V_3O_8$, and
    providing a surface modification of the chemically lithiated $H_2V_3O_8$ in the form of a coating.

2. The method according to claim 1, the method further comprising adding a base after the modifying, wherein the hydrated aluminum salt is an Al(III) salt, and the base is a Brønsted and a Lewis base, and wherein the ratio of Al(III):base is about 1:1.

3. The method according to claim 1, wherein the chemically lithiated $H_2V_3O_8$ has the formula $Li_xH_{2-x}V_3O_8$, wherein x ranges from 0.1 to 1.5.

4. The method according to claim 1, wherein x in $Li_xH_{2-x}V_3O_8$ is about 1.5.

5. The method according to claim 1, wherein after adding the hydrated aluminum salt to chemically lithiated $H_2V_3O_8$, the method further comprising the steps of adjusting the pH to a range between 7 and 8, and then allowing the pH to drop to a range between 6 and 7.

6. The method according to claim 1, wherein the amount of aluminum as a wt % with respect to $H_2V_3O_8$ is between 0.5 wt % and 10 wt %.

7. The method according to claim 1, wherein the amount of aluminum as a wt % with respect to $H_2V_3O_8$ is between 1 wt % to 3 wt %.

8. The method according to claim 1, wherein the amount of aluminum as a wt % with respect to $H_2V_3O_8$ is between 1 wt % to 2 wt %.

9. The method according to claim 1, wherein the amount of aluminum as a wt % with respect to $H_2V_3O_8$ is about 1.5 wt %.

10. The method according to claim 1, wherein the surface modification step is performed in aqueous media at a temperature below 100° C.

11. The method according to claim 1, wherein the surface modification step is performed in aqueous media at a temperature of 70 to 90° C.

12. The method according to claim 1, wherein the surface modification step is performed in aqueous media at a temperature of about 80° C.

13. A $Li_xH_{2-x}V_3O_8$ surface with a surface modification being an $Al(OH)_3$ coating or $Al(OH)_3$ decoration, wherein x has a value between 0.1 to 1.5.

14. The surface modified $Li_xH_{2-x}V_3O_8$ according to claim 13, wherein the surface modification is an $Al(OH)_3$ decoration.

15. The surface modified $Li_xH_{2-x}V_3O_8$ of claim 13, wherein the $Li_xH_{2-x}V_3O_8$ surface comprises carbon black.

16. The surface modified $Li_xH_{2-x}V_3O_8$ according to claim 13, wherein the $Li_xH_{2-x}V_3O_8$ surface further comprises a binder.

17. A cathode comprising a cathode material, wherein the cathode material is a modified $Li_xH_{2-x}V_3O_8$ surface with a surface modification being an $Al(OH)_3$ coating or $Al(OH)_3$ decoration, the cathode material being disposed on a current collector.

18. An electrochemical cell comprising an assembled stack of the cathode of claim 17, a separator, an electrolyte layer, and an anode.

19. A battery comprising at least one electrochemical cell of claim 18.

20. The method according to claim 1, wherein the cathode material is incorporated into a cathode for use in rechargeable lithium ion batteries.

21. The method according to claim 2, wherein the base is ammonia.

22. The method according claim 2, wherein the Al(III) is provided by $Al(NO_3)_3.9H_2O$, $AlCl_3.6H_2O$ or $Al_2(SO_4)_3.18H_2O$, preferably $AlCl_3.6H_2O$ or $Al(NO_3)_3.9H_2O$.

23. The method according claim 22, wherein the Al(III) is provided by $AlCl_3.6H_2O$.

24. The method according to claim 22, wherein the Al(III) is provided by $Al(NO_3)_3.9H_2O$.

25. The method according to claim 2, wherein the base is ammonia.

* * * * *